(12) United States Patent
Linhoff et al.

(10) Patent No.: US 10,065,613 B2
(45) Date of Patent: Sep. 4, 2018

(54) BRAKE SYSTEM FOR VEHICLES

(71) Applicant: Continental Teves AG & Co. oHG, Frankfurt (DE)

(72) Inventors: Paul Linhoff, Neu-Anspach (DE); Alfred Eckert, Mainz-Hechtsheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/109,461

(22) PCT Filed: Dec. 16, 2014

(86) PCT No.: PCT/EP2014/077872
§ 371 (c)(1),
(2) Date: Jul. 1, 2016

(87) PCT Pub. No.: WO2015/106905
PCT Pub. Date: Jul. 23, 2015

(65) Prior Publication Data
US 2016/0325719 A1    Nov. 10, 2016

(30) Foreign Application Priority Data

Jan. 16, 2014 (DE) .......... 10 2014 200 662
Oct. 9, 2014 (DE) .......... 10 2014 220 441

(51) Int. Cl.
*B60T 8/34* (2006.01)
*B60T 7/12* (2006.01)
(Continued)

(52) U.S. Cl.
CPC .......... *B60T 7/12* (2013.01); *B60T 7/042* (2013.01); *B60T 8/348* (2013.01); *B60T 8/4854* (2013.01);
(Continued)

(58) Field of Classification Search
CPC ... B60T 7/12; B60T 8/17; B60T 8/348; B60T 8/343; B60T 8/344; B60T 8/92;
(Continued)

(56) References Cited

U.S. PATENT DOCUMENTS 5,984,429 A * 11/1999 Nell .................. B60T 7/042
303/113.4
6,311,606 B1    11/2001 Tsubouchi
(Continued)

FOREIGN PATENT DOCUMENTS

CN    1820989 A    8/2006
CN    1882463 A    12/2006
(Continued)

OTHER PUBLICATIONS

International Search Report and Written Opinion of the International Searching Authority for International Application No. PCT/EP2014/077872 dated Mar. 3, 2015.
(Continued)

*Primary Examiner* — Thomas W Irvin
(74) *Attorney, Agent, or Firm* — RatnerPrestia

(57) ABSTRACT

A brake system for vehicles, in particular motor vehicles, including a master brake cylinder, in particular a tandem master brake cylinder, a brake booster which is connected upstream of the master brake cylinder, in particular at least four hydraulically actuatable wheel brakes, and a first electrohydraulic brake control device which includes a first pressure regulating valve arrangement for adjusting wheel-specific brake pressures, in particular an electrically actuatable pressure source, and a wheel-specific outlet pressure connection for each wheel brake, wherein the brake booster is designed to be electrically actuatable, and a second electrohydraulic brake control device is provided which includes a second pressure regulating valve arrangement, in
(Continued)

particular for adjusting wheel-specific brake pressures, and which is connected in series between the first brake control device and the wheel brakes.

14 Claims, 2 Drawing Sheets

(51) Int. Cl.
    *B60T 8/48*         (2006.01)
    *B60T 8/92*         (2006.01)
    *B60T 7/04*         (2006.01)
    *B60T 13/14*        (2006.01)
    *B60T 13/66*        (2006.01)
    *B60T 17/18*        (2006.01)

(52) U.S. Cl.
    CPC .............. *B60T 8/4872* (2013.01); *B60T 8/92* (2013.01); *B60T 13/146* (2013.01); *B60T 13/662* (2013.01); *B60T 17/18* (2013.01); *B60T 2270/413* (2013.01)

(58) Field of Classification Search
    CPC . B60T 8/94; B60T 8/96; B60T 13/146; B60T 13/52; B60T 13/565
    See application file for complete search history.

(56) References Cited

U.S. PATENT DOCUMENTS

| | | | | |
|---|---|---|---|---|
| 7,413,265 | B2 * | 8/2008 | Tione | .................... B60T 8/1705 303/122.04 |
| 8,955,922 | B2 | 2/2015 | Kunz | |
| 2001/0045771 | A1 * | 11/2001 | Corio | .................... B60T 8/1703 303/20 |
| 2006/0181143 | A1 | 8/2006 | Yamamoto | |
| 2009/0230762 | A1 | 9/2009 | Giers | |
| 2011/0233011 | A1 * | 9/2011 | Brueggemann | ......... B60T 8/348 188/106 P |
| 2013/0207452 | A1 * | 8/2013 | Gilles | .................... B60T 8/4018 303/9.75 |
| 2016/0082937 | A1 * | 3/2016 | Nakaoka | ................. B60T 8/885 303/15 |
| 2016/0339885 | A1 * | 11/2016 | Linhoff | ................. B60T 8/4072 |
| 2017/0274884 | A1 * | 9/2017 | Besier | ................... B60T 13/662 |

FOREIGN PATENT DOCUMENTS

| | | | |
|---|---|---|---|
| CN | 101397007 A | 4/2009 | |
| CN | 201923121 U | 8/2011 | |
| DE | 19611360 | 9/1997 | |
| DE | 19843221 | 7/1999 | |
| DE | 19946696 | 6/2006 | |
| DE | 102006048787 | 4/2007 | |
| DE | 102010030921 | 8/2011 | |
| DE | 102010003237 | 9/2011 | |
| DE | 102010062387 | 9/2011 | |
| DE | 102011122776 | 1/2013 | |
| JP | 2000184505 A * | 6/2000 | |
| WO | WO-0112484 A1 * | 2/2001 | ............... B60T 7/12 |
| WO | 20120143312 | 10/2012 | |

OTHER PUBLICATIONS

German Search Report for German Application No. 10 2014 220 441.0 dated May 21, 2015, including partial translation.
Chinese Office Action for Chinese Application No. 201480073335.4, dated Jan. 2, 2018, 6 pages.

* cited by examiner

BRAKE SYSTEM FOR VEHICLES

CROSS REFERENCE TO RELATED APPLICATIONS

This application is the U.S. National Phase Application of PCT International Application No. PCT/EP2014/077872, filed Dec. 16, 2014, which claims priority to German Patent Application No. 10 2014 200 662.7, filed Jan. 16, 2014 and German Patent Application No. 10 2014 220 441.0, filed Oct. 9, 2014, the contents of such applications being incorporated by reference herein.

FIELD OF THE INVENTION

The invention relates to a brake system for vehicles.

BACKGROUND OF THE INVENTION

Electrohydraulic brake systems are widespread in motor vehicles. Brake systems are known, for example, from DE 10 2010 062 387 A1, which is incorporated by reference, and comprise a main brake cylinder, a vacuum brake booster which is arranged upstream of the main brake cylinder and an electrohydraulic ABS/ESP brake control device, wherein the brake control device comprises pressure control valves and an electrically controllable pump for adjusting wheel-specific brake pressures. The four wheel brakes are connected to the wheel-specific output pressure connections of the brake control device. By means of the pump, an active, remote-controlled build-up of brake pressure is possible, whereby brake pressure control functions such as the traction control system (TCS) and electronic stability program (ESP) are enabled.

It is to be anticipated that there will also be used in future vehicle brake systems which are suitable for automatically driven vehicles. These brake systems must in principle be systems which can be controlled remotely. This means that a brake request is requested by means of electronic or electrical control signals and can be implemented by the system without any action from the driver. In this instance, a sufficiently high availability of the brake system or the brake function which can be remotely controlled must be ensured for safety reasons.

In the brake systems of DE 10 2010 062 387 A1, in the event of failure of the brake control device, a remotely controlled (driver-independent) build-up of brake pressure and a wheel-specific brake pressure control (for example, anti-lock braking system (ABS)) are no longer possible. Such a brake system is therefore less suitable for motor vehicles which are driven in a highly automated or independent manner.

For highly automatic or highly automated driving (HAD), it is not possible to switch off the brake system after any initial error. In the event of failure of an electronic control device which is associated with the independent driving, it is intended that, at least for a predetermined period of time (for example, a few seconds), a functional independent brake function and steering function can still be constituted since it must not be assumed that the driver can take over control of the vehicle immediately after a failure of the control device, but instead first has to be asked to resume driving operation and has to prepare for this.

SUMMARY OF THE INVENTION

An aspect of the present invention is a brake system for vehicles by means of which the safety requirements of highly automated driving or independent driving are complied with.

An aspect of the invention is based on the notion that the brake booster is constructed so as to be able to be electrically controlled and there is provided an additional (second) electrohydraulic brake control device which comprises a second pressure control valve arrangement and which is connected in series between the first brake control device and the wheel brakes.

An aspect of the invention affords the advantage that, with any single error of the brake system, safe braking of the vehicle in any driving situations, that is to say, in particular with wheel-specific wheel brake pressures, continues to be possible, without the support of the driver being necessary for this.

An aspect of the invention further affords the advantage that there is provided a brake system which ensures a redundant wheel-individual brake control function, in particular an ESP function (ESP: Electronic Stability Program).

The brake system according to an aspect of the invention further affords the advantage that it can optionally be supplemented in a vehicle or in a brake system known per se in order to enable highly automated driving or independent driving.

The brake booster is preferably a reduced pressure brake booster (vacuum brake booster).

The electrically controllable pressure source of the first electrohydraulic brake control device is preferably constructed as a hydraulic pump. In a particularly preferred manner, the hydraulic pump is formed by means of a dual-circuit recirculation pump which is driven by an electric motor.

A pressure control valve arrangement preferably comprises per wheel brake at least one electrically actuatable valve in order to be able to adjust wheel-specific brake pressures at the wheel-specific output pressure connections.

Preferably, the second brake control device does not comprise any electrically controllable pressure source since, in the event of a failure of the electrically controllable pressure source of the first brake control device, a remotely controlled build-up of pressure is possible by means of electrical control of the brake booster.

The electrically controllable brake booster is preferably formed by means of an active brake booster which can be actuated by means of a lifting magnet. Such vacuum brake boosters are known per se.

According to a preferred embodiment of the brake system according to the invention, the second brake control device is constructed to control the electrically actuatable brake booster. In a particularly preferred manner, there are provided means which enable a control of the brake booster by means of the second brake control device. In a quite particularly preferred manner, the electronic control and regulation unit of the second brake control device is connected to the brake booster by means of electrical lines in order to be able to control it. Advantageously, a vacuum sensor and the lifting magnet of the vacuum brake booster are connected to the second brake control device.

Preferably, the first brake control device has at least one input pressure connection to which the main brake cylinder is connected.

The second brake control device preferably comprises for each wheel brake a wheel-specific input pressure connection.

Preferably, each output pressure connection of the first brake control device is connected to an input pressure connection of the second brake control device so that, in particular in the event of a failure of the second brake control device, the wheel-specific wheel brake pressures of the first brake control device can be transmitted to the wheel brakes by the second brake control device.

The second brake control device preferably comprises for each wheel brake a wheel-specific output pressure connection which is connected to a, in particular precisely to one, wheel brake. The output pressure lines of the second brake control device are in a particularly preferred manner directly connected to the wheel brakes.

In order to adjust or control the wheel-specific wheel brake pressures by means of the second brake control device, it preferably comprises for each wheel brake an electrically actuatable input valve, an electrically actuatable output valve and a low-pressure store. In a particularly preferred manner, the input valve is constructed so as to be able to be controlled in an analog manner or analogized.

For pressure control, a pressure sensor for determining the pressure at an output pressure connection per wheel brake circuit is preferably provided in the second brake control device.

Preferably, the first brake control device is constructed integrally as a brake control device having an electronic control and regulation unit and a hydraulic control and regulation unit.

The second brake control device is also preferably constructed integrally as a brake control device having an electronic control and regulation unit and a hydraulic control and regulation unit.

According to a preferred embodiment of the brake system according to the invention, for each of the wheels which are provided with a wheel brake, at least two devices are provided for detecting a wheel speed, wherein the signal of one of the devices is supplied to the first brake control device and the signal of the other device is supplied to the second brake control device.

According to another preferred embodiment of the brake system according to the invention, for each of the wheels which are provided with a wheel brake, at least one redundant device for detecting a wheel speed is provided, wherein in each case one signal of the device is supplied to the first brake control device and the other signal is supplied to the second brake control device.

In both embodiments, the wheel speed information of all the wheels is available to each of the brake control devices independently of each other for brake pressure control.

For the redundant configuration of ESP functions, at least two yaw rate sensors or two sensor clusters are preferably provided with at least one yaw rate sensor each, wherein one yaw rate sensor/sensor cluster is associated with the first brake control device and the other yaw rate sensor/sensor cluster is associated with the second brake control device.

Alternatively, it is preferable for there to be provided a dual constructed yaw rate sensor or sensor cluster whose two independent signals are provided for the first and the second brake control device.

Preferably, in the event of failure of the first brake control device, the second brake control device (where possible without delay) takes over the brake functions. In a particularly preferred manner, the second brake control device takes over the pressure build-up function by means of the electrically actuatable brake booster or the ESP function/ESC function, by means of the electrically actuatable brake booster and the second pressure control valve arrangement.

In addition to simple brake functions, the brake system preferably carries out dynamic travel control functions (Electronic Stability Program (ESP), Electronic Stability Control (ESC)) and/or other brake activations (such as Active Cruise Control (ACC)) in a redundant remotely controlled manner.

Preferably, the brake system comprises at least two brake control devices, a first brake control device which is in a particularly preferred manner identical or similar to a conventional ABS/ESP brake control device known per se, and a second brake control device which is connected downstream in a hydraulic series connection of the first brake control device and which is configured to control the electrically actuatable brake booster.

Preferably, the brake control devices are configured in such a manner that, during normal operation (no failure of a brake control device), one brake control device (advantageously the second brake control device) is in a passive mode (for example, only self-monitoring and test) and the other brake control device (advantageously the first brake control device) carries out the usual control functions.

Preferably, the second brake control device comprises a pressure control valve arrangement and no pressure source, and means for controlling the electrically controllable brake booster by means of the electronic control and regulation unit of the second brake control device are provided.

The hydraulic and electrical circuit of the brake system is preferably constructed in such a manner that the first brake control device can carry out various or all brake control functions independently of the second brake control device and the second brake control device can also carry out various or even all brake control functions by controlling the brake booster and the second pressure control valve arrangement and, in a particularly preferred manner, also the braking of individual or a plurality of wheels in order to influence lane-keeping or steering.

Preferably, the first brake control device and the second brake control device are supplied from more than one electrical energy source. In a particularly preferred manner, the first brake control device and the second brake control device have at least a substantially independent electrical energy supply, in particular voltage supply.

BRIEF DESCRIPTION OF THE DRAWINGS

Other preferred embodiments of the invention will be appreciated from the dependent claims and the following description with reference to Figures.

In the schematic drawings.

DETAILED DESCRIPTION OF THE PREFERRED EMBODIMENTS

Figure 1:
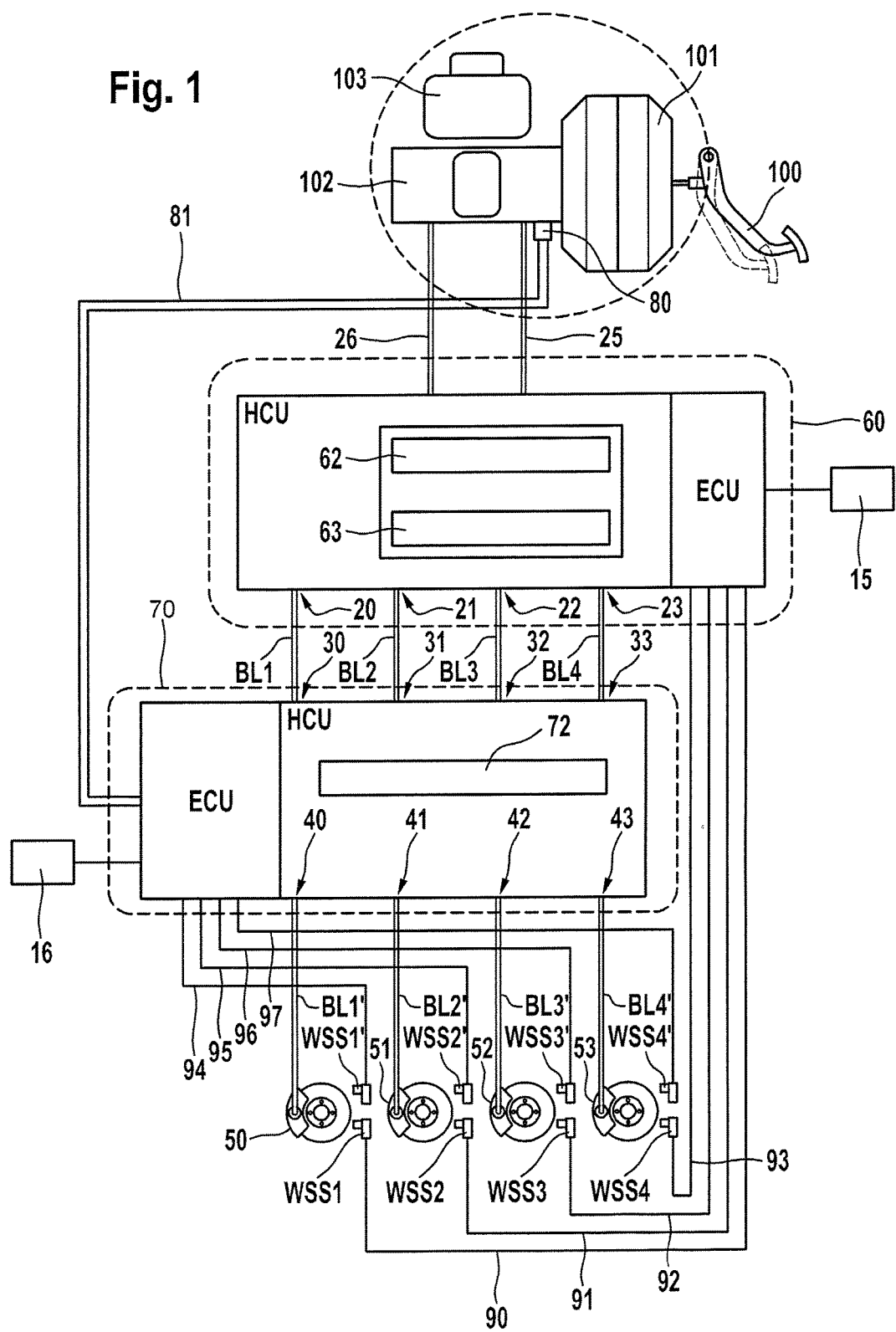
FIG. 1 shows an embodiment of a brake system according to an aspect of the invention.

FIG. 1 is a schematic illustration of an embodiment of a brake system according to an aspect of the invention. The exemplary brake system comprises a brake pedal 100, a main brake cylinder (tandem main brake cylinder) 102 with associated pressure medium storage container 103, an (active) electrically controllable vacuum brake booster 101 which is arranged upstream of the main brake cylinder, a first electrohydraulic brake control device 60, a second electrohydraulic brake control device 70 and four hydraulic wheel brakes 50, 51, 52, 53.

The two pressure chambers of the tandem main brake cylinder 102 are connected by means of brake circuit lines 25, 26 to the two input pressure connections of the brake control device 60. The first brake control device 60 has wheel-specific output pressure connections 20, 21, 22, 23 and the second brake control device 70 has wheel-specific input pressure connections 30, 31, 32, 33. Each output pressure connection 20, 21, 22, 23 is connected to precisely one of the input pressure connections 30, 31, 32, 33 by means of a brake line BL1, BL2, BL3, BL4. The second brake control device 70 has wheel-specific output pressure connections 40, 41, 42, 43 which are connected by means of brake lines BL1', BL2', BL3', BL4' to one of the wheel brakes 50, 51, 52, 53, respectively. The second electrohydraulic brake control device 70 is consequently connected hydraulically in series between the first brake control device 60 and the wheel brakes 50, 51, 52, 53.

The brake control device 60 is, for example constructed integrally as a brake control device (HECU) with an electronic control and regulation unit (ECU) and a hydraulic control and regulation unit (HCU).

The hydraulic unit of the brake control device 60 comprises, for example, four wheel brake circuits with the associated four output pressure connections 20, 21, 22, 23 which are arranged in two brake circuits, and a pressure control valve arrangement 62 for adjusting wheel-specific wheel brake pressures. Advantageously, an electrically controllable pressure source 63, for example, a dual-circuit pump, is provided in the hydraulic unit in order, for example, to be able to return pressure medium or to actively build up brake pressure.

Advantageously, the brake control device 60 is constructed as an ABS/ESP brake control unit which is known per se and which comprises a pressure control valve arrangement 62 with twelve valves for controlling the wheel brake pressures, a low-pressure store for each brake circuit and a dual-circuit return pump. For example, the hydraulic control and regulation unit comprises one input valve and one output valve per wheel brake and a separation valve and a switching valve and a low-pressure store for each brake circuit.

The brake control device 70 is, for example, constructed integrally as a brake control device (HECU) with an electronic control and regulation unit (ECU) and a hydraulic control and regulation unit (HCU).

The active vacuum brake booster 101 comprises a vacuum sensor and an electromagnet (lifting magnet) for the booster control, which are schematically indicated by the reference numeral 80. The electronic control and regulation unit of the brake control device 70 is constructed to control the vacuum brake booster 101 and therefore connected thereto by means of corresponding lines 81, in particular connected to the vacuum sensor and the electromagnet.

The hydraulic unit of the brake control device 70 comprises, for example, four wheel brake circuits with the associated four input pressure connections 30, 31, 32, 33 and output pressure connections 40, 41, 42, 43 and a pressure control valve arrangement 72 for adjusting wheel-specific wheel brake pressures. Since the brake control device 70 is suitable for controlling the electrically controllable vacuum brake booster 101 for building up a brake pressure, the brake control device 70 advantageously comprises no electrically controllable pressure source.

There are associated with the wheel of each wheel brake 50, 51, 52, 53, for example, two wheel speed sensors, that is to say, wheel speed sensors WSS1 and WSS1' for the wheel of the wheel brake 50, wheel speed sensors WSS2 and WSS2' for the wheel of the wheel brake 51, wheel speed sensors WSS3 and WSS3' for the wheel of the wheel brake 52, wheel speed sensors WSS4 and WSS4' for the wheel of the wheel brake 53. In each case, the signal of one wheel speed sensor WSS1, WSS2, WSS3, WSS4 is supplied to the first brake control device 60 by means of a signal line 90, 91, 92, 93, the signal of the other wheel speed sensor WSS1', WSS2', WSS3', WSS4' is supplied to the second brake control device 70 by means of a signal line 94, 95, 96, 97.

The additional second wheel speed sensors WSS1', WSS2', WSS3', WSS4' which are supplied to the second brake control device 70 are advantageous for traction control if other replacement information is not available or is not adequate.

In place of at least two devices per wheel brake for detecting the wheel speed, it is also possible to provide a redundant device for detecting the wheel speed (redundant wheel speed sensor) which supplies two wheel speed signals which are independent of each other.

The brake system enables a redundant remote control and redundant wheel-specific brake control of the brake system as a result of the electrical controllability of the vacuum brake booster 101 by the second brake control device 70 and the pressure control valve arrangement 72 of the second brake control device 70.

For example, a brake system which is known per se and which has a main brake cylinder 102 and (first) electrohydraulic brake control device 60 is expanded by means of an additional (second) electrohydraulic brake control device 70 with an electronic control and regulation unit (ECU) and hydraulic control and regulation unit (HCU), wherein the brake control device 70 constitutes a functional unit comprising electrical control of an active vacuum brake booster (in the ECU of the brake control device 70) and the pressure control valve arrangement 72 which is arranged downstream of the first brake control device 60 (in the HCU of the brake control device 70) with associated electrical control (in the ECU of the brake control device 70).

Figure 2:
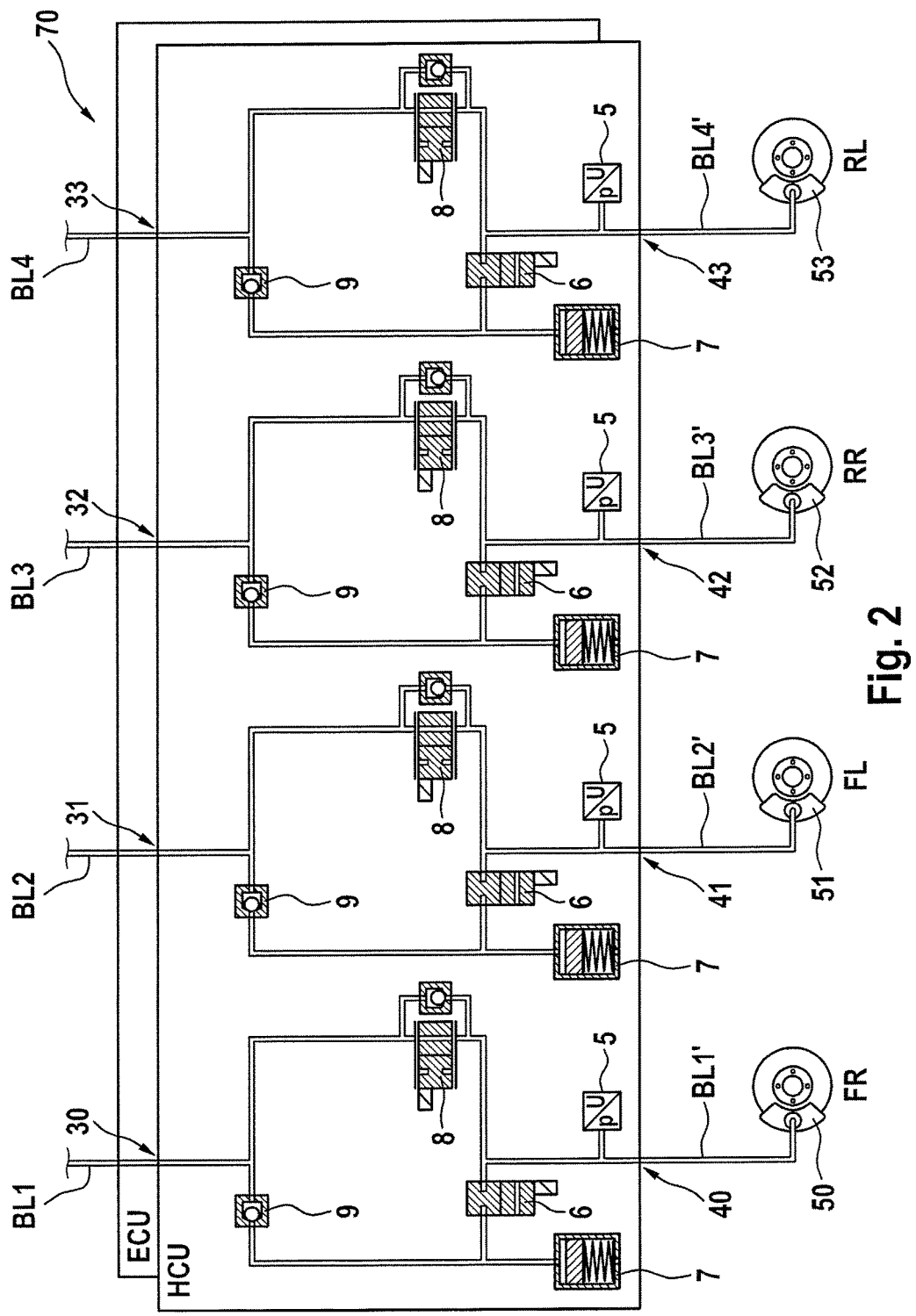
FIG. 2 shows an embodiment of a second brake control device.

FIG. 2 illustrates an embodiment of a second electrohydraulic brake control device 70. The brake control device 70 is constructed in an integral manner, that is to say, as a brake control device which comprises an electronic control and regulation unit (ECU) and a hydraulic control and regulation unit (HCU).

By way of example, the brake control device 70 is illustrated for four wheel brakes 50, 51, 52, 53, an expansion to more wheel brakes is readily possible. By way of example, the wheel brake 50 is associated with the front right wheel (FR), the wheel brake 51 is associated with the front left wheel (FL), the wheel brake 52 is associated with the rear right wheel (RR) and the wheel brake 53 is associated with the rear left wheel (RL). Other brake circuit distributions are possible.

There is connected to the four wheel-specific input pressure connections 30, 31, 32, 33 of the brake control device 70 a brake line BL1, BL2, BL3, BL4, respectively, which originates from one of the wheel-specific output pressure connections 20, 21, 22, 23 of the first brake control device 60 which is not illustrated. There is connected to the four wheel-specific output pressure connections 40, 41, 42, 43 of the brake control device 70 a brake line BL1', BL2', BL3', BL4' which leads to one of the wheel brakes 50, 51, 52, 53.

The brake control device 70 comprises, for example, four (for each wheel brake a pressure control circuit) identical completely separate pressure control circuits each with an electrically actuatable input valve 8 which is advantageously open in a powerless state, an electrically actuatable output valve 6 which is advantageously closed in a powerless state and a low-pressure store 7.

For each pressure control circuit there is arranged in the connection between the respective input and output pressure connection, on the one hand, a parallel connection of the input valve 8 and, on the other hand, a series connection of the non-return valve 9 which is open in the direction of the input connection and the output valve 6.

By way of example, an additional non-return valve (not described in greater detail) which is open in the direction of the input connection is connected in parallel with the input valve 8.

By way of example, the input valves 8 are analogized or constructed so as to be able to be controlled in an analog manner in order in the event of a brake pressure control using the brake control device 70 to enable the most precise possible wheel brake pressure control.

In order to dissipate brake pressure during an anti-locking control operation, each wheel brake can be connected to the associated low-pressure store 7 by means of the output valve 6. The volume which is discharged through the output valves 6 is stored in the low-pressure stores 7 provided. After the brake control has ended, the low-pressure stores 7 can independently empty themselves again via the non-return valves 9.

The brake control device 70 does not comprise any pump.

There is further provided by way of example one pressure sensor 5 per wheel brake circuit in order to measure the pressure adjusted by the vacuum brake booster.

Optionally, the brake control device 70 may be provided with fewer pressure sensors if a wheel-specific pressure control can be dispensed with or a pressure estimation is sufficient.

In order to be able to carry out stability control functions in the brake system according to the invention in a redundant manner, the sensor signals which are required for the control function, in particular the yaw rate signal, are advantageously also available in a redundant manner. Thus, in the embodiment of FIG. 1, there are provided, for example, at least two yaw rate sensors 15, 16 or two sensor clusters with at least one yaw rate sensor, wherein one yaw rate sensor/sensor cluster 15 is connected to the electronic control and regulation unit of the first brake control device 60 and the other yaw rate sensor/sensor cluster 16 is connected to the electronic control and regulation unit of the second brake control device 70.

Alternatively, there may be provided a dual yaw rate sensor or sensor cluster which provides two independent signals. One signal is supplied to the first brake control device and the other signal is supplied to the second brake control device.

In a first operating mode of the brake system for dynamic travel control (first remote control mode), for example, in an error-free state of the brake system, by means of the electrically actuatable pressure source 63 (for example, by means of the motor/pump unit) of the first brake control device 60, a brake pressure is built up in an active manner and, by means of the pressure control valve arrangement 62 of the first brake control device 60, wheel-specific wheel brake pressures are adjusted. The pressure source 63 and pressure control valve arrangement 62 of the first brake control device 60 are controlled by the electronic control and regulation unit of the first brake control device 60. The second brake control device 70 only transmits/passes the wheel-specific brake pressures, for example, via input valves 8 which are open in a powerless state.

In a second operating mode of the brake system for dynamic travel control (second remote control mode), for example, in the event of an error in the first brake control device 60, by means of the electronic control and regulation unit of the second brake control device 70, the brake booster is controlled in order to actively build up a brake pressure in the main brake cylinder. The first brake control device 60 only transmits/passes the wheel-specific brake pressures, for example, via output valves which are open in a powerless state. The adjustment of wheel-specific wheel brake pressures is carried out by means of the pressure control valve arrangement 72 of the second brake control device 70, which is also controlled by means of the second electronic control and regulation unit of the second brake control device 70.

The brake system advantageously further comprises a third electronic control and regulation unit or is connected to a third electronic control and regulation unit (not illustrated). This serves, for example, to control additional vehicle functions, in particular the functions for highly automated or autonomous driving (HAD). The third control and regulation unit transmits, for example, a brake request in the context of a remote control instruction, to the brake system which is transmitted to the brake control devices 60, 70. To this end, the brake control device 60 is connected via a first data connection, for example, a first data bus, and the brake control device 70 is connected via a second data connection, for example, a second data bus, to the third control and regulation unit. The third control and regulation unit is, for example, a vehicle controller or a HAD controller.

As a result of an aspect of the invention, there is provided a redundant brake system which after any failure of a component can continue to be controlled remotely. Furthermore, the brake system, if the request is given from the vehicle side, can also carry out the stability control function (ESP).

The invention claimed is:

1. A brake system for vehicles, comprising a main brake cylinder,
   a brake booster which is arranged upstream of the main brake cylinder,
   at least four hydraulically actuatable wheel brakes and
   a first electrohydraulic brake control device which comprises:
      a first pressure control valve arrangement for adjusting brake pressures independently for each of the at least four wheel brakes, and
      an electrically controllable pressure source, and for each of the at least four wheel brakes a wheel-specific output pressure connection,
   wherein the brake booster is constructed so as to be able to be electrically controlled and there is provided a second electrohydraulic brake control device which comprises a second pressure control valve arrangement, for adjusting brake pressures independently for each of the at least four wheel brakes and which is connected in series between the first brake control device and the at least four wheel brakes.

2. The brake system as claimed in claim 1, wherein the second brake control device does not comprise any pressure source.

3. The brake system as claimed in claim 2, wherein the electrically controllable brake booster is an active vacuum brake booster which is configured to be actuated by a lifting magnet.

4. The brake system as claimed in claim 1, wherein the electrically controllable brake booster is an active vacuum brake booster which is configured to be actuated by a lifting magnet.

5. The brake system as claimed in claim 1, wherein the second brake control device is constructed to control the electrically actuatable brake booster.

6. The brake system as claimed in claim 1, wherein the first brake control device has at least one input pressure connection to which the main brake cylinder is connected.

7. The brake system as claimed in claim 1, wherein the second brake control device comprises a wheel-specific input pressure connection for each wheel brake.

8. The brake system as claimed in claim 1, wherein each output pressure connection of the first brake control device is connected to an input pressure connection of the second brake control device.

9. The brake system as claimed in claim 1, wherein the second brake control device comprises for each wheel brake a wheel-specific output pressure connection which is connected to one wheel brake.

10. The brake system as claimed in claim 1, wherein the second brake control device comprises for each wheel brake an electrically actuatable input valve which is configured to be controlled in an analog manner or which is constructed so as to be analogized, an electrically actuatable output valve and a low-pressure store, and a pressure sensor.

11. The brake system as claimed in claim 1, wherein the first brake control device is constructed integrally as a brake control device having an electronic control and regulation unit (ECU) and a hydraulic control and regulation unit (HCU).

12. The brake system as claimed in claim 1, wherein the second brake control device is constructed integrally as a brake control device having an electronic control and regulation unit (ECU) and a hydraulic control and regulation unit (HCU).

13. The brake system as claimed in claim 1, wherein for each of the wheels which are provided with a wheel brake
- at least two devices are provided for detecting a wheel speed, wherein a signal of one of the devices is supplied to the first brake control device and a signal of the other device is supplied to the second brake control device or
- at least one redundant device for detecting a wheel speed is provided, wherein in each case one signal of the device is supplied to the first brake control device and an other signal is supplied to the second brake control device.

14. The brake system as claimed in claim 1, further comprising means for controlling the brake booster by the second brake control device.

* * * * *